March 30, 1971    W. J. TIBBLE ET AL    3,573,149
DOUBLE GLAZED WINDOWS
Filed July 17, 1967    2 Sheets-Sheet 1
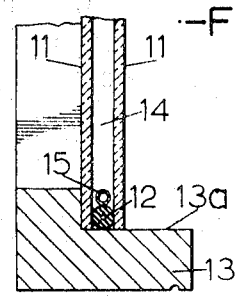
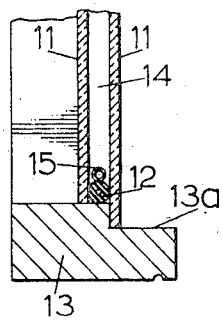
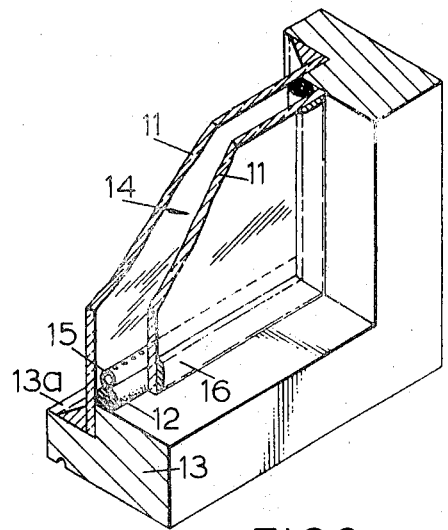
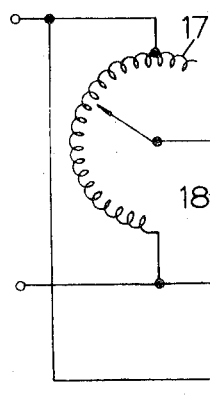

United States Patent Office 3,573,149
Patented Mar. 30, 1971

3,573,149
DOUBLE GLAZED WINDOWS
William J. Tibble, London, James P. Bock, Chigwell, Roy F. Lankester, Potters Bar, and George E. Patterson, Ilford, England; said Tibble, Bock, and Lankester assignors to Insitu Double Glazing Limited, London, England
Filed July 17, 1967, Ser. No. 698,363
Claims priority, application Great Britain, July 22, 1966, 33,028/66
Int. Cl. C03c 27/10; B32b 17/00
U.S. Cl. 161—45                          2 Claims

ABSTRACT OF THE DISCLOSURE

A method of making a multi-panel unit having a cavity construction, comprising cutting at least two panels to a required size, degreasing, and priming the perimeter regions of each panel, cutting a thermoelectric spacer and sealing strip to the peripheral length of the panels with sufficient extra length to form electrical terminals for connection to a power supply source, unsheathing the ends of a resistance wire passing through said strip and applying an electric potential thereto to heat the strip until it becomes pliable, applying the strip to the perimeter of one panel, re-applying an electric potential to the resistance wire to soften the strip aligning a second panel and pressing the panels together, again applying an electric potential to cure the strip, and trimming off the ends of said strip.

---

This invention concerns a method of making multi-panel units such as double glazed windows.

Double glazed window units of both the in-situ and factory made types are of a sealed cavity construction formed by adhering two glass panes about their edge regions by means of a spacing element. The air contained within the cavity is preferably dehydrated to prevent condensation forming within the cavity at temperatures which are to be reasonably expected in the location at which the unit is fitted, as a result of changeable atmospheric conditions. In addition the air within the cavity must remain stationary if the maximum thermal insulating property of the unit is to be attained and the seal must, therefore, be effectively 100% air-tight. The spacing element and all materials used in obtaining the seal must also be impervious to moisture vapour and resistant to deterioration due to variation of atmospheric conditions, so that the seal maintains its efficiency throughout the life expectation of the unit.

Factory made units are used primarily for glazing new property, whereas the in-situ units are primarily applied to existing property. The factory made units can again be sub-divided into two categories, these being (i) flush edged units for standard flush window frame rebates where sufficient width of glazing platform is available to accommodate the unit, and (ii) a stepped edge unit where the glass panes are of slightly different size, resulting in a flanged edge enabling glazing to rebates where insufficient glazing platform width is available to accommodate flush edged units. The dimensions of the flange will be dependent upon the type of frame to be glazed.

According to the invention, a method of making multi-panel units having a cavity construction comprises cutting the panels to a required size, degreasing and priming the perimeter regions of each panel, cutting a thermo-electric spacer and sealing strip to the peripheral length of the panels with sufficient extra length to form terminals for connection to an electrical supply source, unsheathing the ends of a resistance wire passing through said strip and applying an electric potential thereto to heat the strip until it becomes pliable, applying the strip to the perimeter of one panel, re-applying an electric potential to the resistance wire to soften the strip, aligning a second panel and pressing the panels together, again applying an electric potential to cure the strip and trimming off the ends of said strip.

When making double glazed window units by the method of the invention, the panels are, of course, glass panes and have their surfaces defining the cavity cleaned prior to degreasing and priming, preferably by means of a proprietary glass cleaning liquid containing a disinfecting agent. Degreasing may be carried out by a degreasing agent such as trichloroethylene, available commercially as Solvent 30, S.B.P. 3, and priming by a chemical cleaning and priming solvent, the molecules of which form a bond between the glass (or other panel material) and the material of the sealing strip.

Thus, the production of a multi-panel glazing unit, in accordance with the invention includes cleaning the surfaces of at least two glass panes, cut to the required size, with a cleaning liquid preferably containing a disinfecting agent, degreasing and priming the edge regions of the ultimately inwardly facing (of the resulting panel cavity) glass surfaces, cutting a thermo-electric spacer and sealing strip, available commercially as Solbit, to the peripheral length of the panels with sufficient extra length to form terminals for connection to an electrical power supply source, unsheathing the ends of a resistance wire passing through said strip and applying an electric potential thereto to heat the strip until it becomes pliable, applying the strip to the perimeter of one of said glass panes, pressing a desiccant into the strip, aligning a second glass pane with the strip and pressing the panes together, curing the sealing strip by applying a further electric potential, disconnecting the terminals from the electrical supply source, trimming off terminal ends of the sealing strip and allowing the strip to cool.

The thermo-electric spacer and sealing strip (packed in a non-stick container until required for use) may consist basically of a non-cured neoprene compound in bead form incorporating a centrally located resistance wire. The dimensions of the bead are variable and dependent upon the type and size of the unit required. In a pre-cured form the compound is of a non-rubbery and mastic construction.

Accelerated curing of the compound is obtained by subjecting the resistance wire to a controlled and continuous electric potential, the voltage employed being dependent upon the linear length to be processed. For curing to take place the resistance wire should attain a temperature of about 100° C. for a period of time dependent upon the cross-sectional area of the sealing strip being processed.

During the curing process, heat from the resistance wire is imparted to the sealing strip causing a chemical reaction to take place between the cross linkages of the curing agents and additives, and the closed molecular and cellular structure of the neoprene compound. After curing the compound becomes an elastomer of a tough and rubbery form of solid construction, being impervious to moisture vapour, extreme sunlight and other climatic conditions. The pre-cured sealing strip should be stored at a temperature of 1.6° C. or less to ensure that natural curing does not take place.

The invention will now be described further, by way of example, with reference to the accompanying drawings, in which:

FIG. 1 is a fragmentary section of a flush-edged double glazed window unit in accordance with the invention;

FIG. 2 is a similar view of stepped edge double glazed window unit;

FIG. 3 is a fragmentary detail of an installed double glazed window unit of the type shown in FIG. 2;

Figure 4:
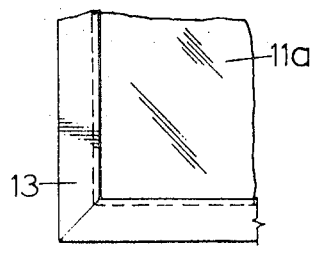
Figure 4A:
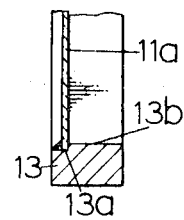
Figure 5:
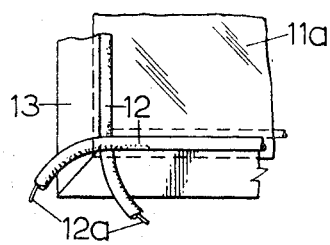
Figure 5A:
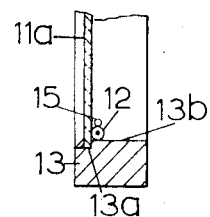
Figure 6:
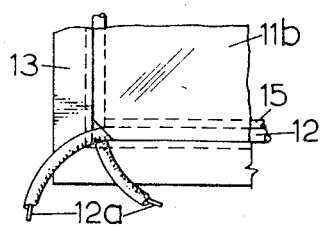
Figure 6A:
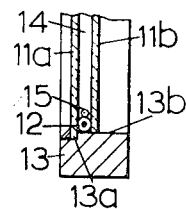
Figure 7:
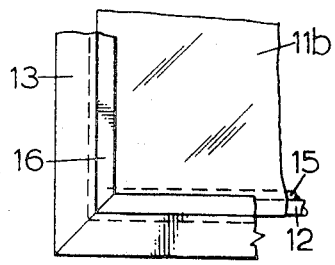
Figure 7A:
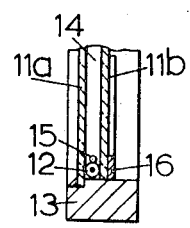

FIG. 4 and 4a respectively show a fragmentary side elevation and a fragmentary section of an existing window requiring conversion to a double glazed unit;

FIGS. 5 and 5a are similar views of the window shown in FIGS. 4 and 4a at a stage during conversion to a double glazed unit in accordance with the method of the present invention;

FIGS. 6 and 6a are views corresponding to FIGS. 5 and 5a, but showing the window during a later stage in its conversion to a double glazed unit;

FIGS. 7 and 7a are views corresponding to FIGS. 5 and 5a, but showing the fully converted double glazed unit; and FIG. 8 is a circuit diagram of a voltage control unit used in supplying electrical power to a thermo-electric sealing strip used in producing a multi-panel unit in accordance with the invention.

The flush-edged double glazing unit as shown in FIG. 1 may be either a factory made unit or a unit converted in-situ from an existing single glazed window, and comprises two glass panes 11 sealed in spaced relationship by means of a thermo-electric spacer and sealing strip 12. Since, however, for this type of unit, the glazing platform 13a of a window frame 13 must have sufficient width to accommodate the glazing panel, it will be appreciated that such panels are usually factory made because existing frames generally have a glazing platform width sufficient only to accommodate a single glass pane. Such factory made double glazing units are made, in accordance with the method of the invention, as will now be described.

After cutting the glass panes 11 to size in accordance with the specification of the unit required, the ultimately inwardly facing (of the resulting panel cavity 14) glass surfaces are cleaned with proprietary glass cleaning liquid preferably containing a disinfecting agent. The edge regions of the cleaned surfaces are then degreased and primed with a degreasing agent and trimming solvent as previously mentioned, after which the thermo-electric sealing strip 12, such as that previously described, is cut to the peripheral length of the glass panes 11 with sufficient extra length to form a pair of terminals (not shown in FIG. 1) for connection to an electric power supply source, and the ends of a resistance wire passing through the strip 12 are unsheathed and connected to a voltage control unit supplying the power. The voltage control unit will be described later in more detail.

In order to make the sealing strip 12 pliable, an electric potential is applied to the terminals and a current passed e.g. 8 amps. for 45 to 120 seconds dependent on site climatic conditions and the age of the sealing strip 12. After becoming pliable the sealing strip 12 is applied to the degreased and primed edge regions of one of the glass panes 11, the end regions of the strip being crossed at one corner of the pane and moulded to a flush finish.

A desiccant such as silica-gel or molecular sieve in pellet or crystal form, the grade and quantity utilised being dependent upon the type and size of the double glazed unit, is pressed into the strip 12. The desiccant may be housed in a container 15, preferably of drawn aluminum. Such a drawn container may be pre-filled with desiccant and cut to the desired length prior to its impression into the pliable sealing strip 12, the ends of the cut length being plugged to retain the desiccant within the container which is then perforated along its length to allow moisture within the cavity to be absorbed by the desiccant. The container 15 is of course, placed in position with its perforations directed inwardly of the cavity 14. The second glass pane 11 is then placed in position against the strip 12 and pressed lightly home; spacer members being placed between the panes if desired. A further electric potential is then applied to the thermo-electric spacing strip 12 to soften the sealing strip, a current of e.g. 8 amps. being passed for 1½ to 4 minutes dependent on site climatic conditions. No pressure is applied to the glass panes 11 during this period, but upon its expiration the glass panes are gently but firmly pressed together until the sealing strip 12 shows a black vitreous effect all round. The strip 12 is then cured by passing a current for a minimum of 6 minutes at 8 amps., after which the terminal ends of the sealing strip 12 are disconnected from the power supply, the ends of the strip 12 then being trimmed off and the double glazed unit allowed to cool for approximately 15 to 20 minutes. The completed unit is then glazed to a wood or metal frame with putty and the exterior surfaces of the glass panes 11 cleaned with cleaning liquid.

Production of a stepped edge double glazing unit as shown in FIG. 2 is the same as described above in relation to the flush-edged unit shown in FIG. 1, except that the glass panes 11 are of slightly differing size, the larger pane requiring a somewhat larger area of degreasing and priming about its edge regions.

Production of an in-situ double glazing unit as shown in FIG. 3 is also basically similar to the method of producing a factory made unit described with reference to FIG. 1, the main difference being that the existing glass pane is utilised as one of double glazing panes. The various stages in producing a double glazed unit as illustrated in FIG. 3 are shown progressively in FIGS. 4 and 4a to FIGS. 7 and 7a, and in which FIGS. 4 and 4a show an existing single glazed window unit, the glass pane 11a of which is utilised in conversion to a double glazed unit and the glazing platform 13a of its frame 13 being too narrow to accommodate a second glass pane in spaced relationship with the pane 11a. It is therefore intended to mount a second glass pane on the frame surface 13b, and such second pane is accordingly cut to the required dimensions. Both the existing glass pane 11a and the second glass pane are cleaned, degreased and primed as previously described. Existing putties may also be renewed if necessary.

FIGS. 5 and 5a show the existing window unit partially converted to a double glazed unit, the spacer and sealing strip 12 and the desiccant in container 15 having been placed in position. The terminal ends 12a of the strip 12 for connection to the power supply source, can be seen in FIG. 5. An additional glass pane 11b is then placed in position as shown in FIGS. 6 and 6a, the pane 11b preferably having a recess cut in one corner thereof to allow the ends 12a of strip 12 to be passed out from the cavity 14 between the panes 11a and 11b. Spacing members, not shown, may be placed between the glass panes to ensure that the panes assume a required spacing as pressure is applied to the second pane 11b to press the panes together to form an adequate seal with the strip 12.

Softening and curing of the strip 12 is carried out as previously described. However, in order to prevent the terminal ends 12a of strip 12 from adhering to the window frame 13 during the softening and curing process, a protective angle strip (not shown) may be placed in the relevant corner of the frame 13 so as to prevent the ends 12a from contacting the frame. Such an angle strip may be of any convenient material and is removed with the terminal ends 12a after curing has taken place, after which the outer surface of the new glass pane 11b is cleaned and its edge regions degreased and primed in readiness to receive an outer covering strip 16 as shown in FIGS. 7 and 7a. The covering strip 16 may be of extruded plastics material, metal foil or of small section timber mould and is preferably held in position by an adhesive tape (not shown) coated on both sides with an impact adhesive impervious to moisture vapour. Alternatively this covering strip may be omitted and the outer peripheral edge region of pane 11b may be rubbed with a suitable abrasive such as carborundum to remove the sharp arris.

The voltage control unit, the circuit diagram of which is shown in FIG. 8, may comprise a variable transformer 17, a step-down transformer 18, a moving iron ammeter 19 (reading A.C.), a magnetically operated circuit breaker 20 with a combined ON/OFF switch 21, and a time control device 22 all wired as shown. The time control device may be a simple clockwork mechanism such as is commonly used, for example on domestic cookers, and is connected in series with the circuit breaker. In such an arrangement the time control device 22 controls the magnetic circuit of the breaker 20 with the switch 21 in the OFF position, and upon expiration of a set time period the magnetic circuit is broken by the control device 22 and the breaker 20 is moved under spring action to break the main circuit to the sealing strip 12. The switch 21 may be used to control the circuit independently of the time control device. The output from the voltage control unit is controlled by the variable transformer 17. The components of the voltage control unit are preferably accommodated in a suitable housing (not shown) provided with roving clip-on terminals 23 for connection to the terminals 12a of the sealing strip 12.

The invention is not, however, intended to be limited to double glazed window units. For example glazed units having three or more sheets of glass for use at airports or in arctic regions may be made in accordance with the method of the present invention, as may so-called "demist" panels for shop windows or vehicles, glass signs affixed to the internal surface of shop windows, condensation-free double glazed mirrors and other multi-panelled units. Patterned fibre glass may be placed in the cavity between two glazing panels, if desired, to produce a diffused light.

We claim:

1. A method of making a multi-panel unit having a cavity construction, comprising cutting at least two glass panels to a required size, degreasing and priming the perimeter regions of each panel, cutting a thermo-electric spacer and sealing strip to the peripheral length of the panels with sufficient extra length to form electrical terminals for connection to a power supply source, unsheathing the ends of a resistance wire passing through said strip and applying an electric potential thereto to heat the strip until it becomes pliable, applying the strip to the perimeter of one panel, re-applying an electric potential to the resistance wire to soften the strip, aligning a second panel and pressing the panels together, again applying an electric potential to cure the strip, and trimming off the ends of said strip.

2. A method of making a multi-panel glazing unit, including cleaning the surfaces of at least two glass panes with a cleaning liquid, degreasing and priming the edge regions of the ultimately inwardly facing glass surfaces, cutting a thermo-electric spacer and sealing strip to the peripheral length of the panels with sufficient extra length to form terminals for connection to an electrical power supply source, unsheathing the ends of a resistance wire passing through said strip and applying an electric potential thereto, to heat the strip until it becomes pliable, applying the strip to the perimeter of one of said glass panes, pressing a desiccant into the strip aligning a second glass pane with the strip and pressing the panes together, curing the sealing strip by applying a further electric potential, disconnecting the terminals from the electrical supply source, trimming off the terminal ends of the sealing strip and allowing the strip to cool.

References Cited

UNITED STATES PATENTS 3,263,014 7/1966 Deisenroth _____ 264—261
3,379,859 4/1968 Mariott _____ 161—45X JOHN T. GOOLKASIAN, Primary Examiner J. C. GIL, Assistant Examiner U.S. Cl. X.R.

52—171, 616, 398; 156—106, 107, 272; 161—192